UNITED STATES PATENT OFFICE.

NILS R. HOLMQUIST, OF BOSTON, MASS.

IMPROVED COMPOSITION FOR FILLING WOOD.

Specification forming part of Letters Patent No. 52,046, dated January 16, 1866.

*To all whom it may concern:*

Be it known that I, NILS R. HOLMQUIST, of the Kingdom of Sweden, but at present residing in Boston, of the United States of America, have invented a new and useful composition to be applied to wood or other material for the purpose of filling or stopping cracks or cavities thereof; and I do hereby declare the same, and the ingredients and manner of compounding them, to be described as follows:

The constituents of the said composition, and the proportions of them used in making it, are linseed-oil, one-half pint; flour boiled in water to a paste, one gill; white vitriol, two ounces; litharge, two ounces; carbonate of lime, one pound.

The proportions as above set forth may be varied without changing the character of the composition. So there may be mixed with them a material for coloring the composition, as may be required.

Preparatory to combining the ingredients together each of the last three of them above mentioned should be properly reduced to a fine powder, after which all of them, with the paste and oil, may be put into a suitable vessel or mortar and be thoroughly mixed together.

The flour-paste, besides contributing to the union of the other ingredients, imparts to the mixture a peculiar hardness, which it would not otherwise possess. The litharge and the vitriol give drying qualities to the oil and operate together better than either does separately. The carbonate of lime gives body to the mixture.

I claim as my invention—

The said composition, made of the ingredients and in the manner and for the purpose substantially as described.

NILS R. HOLMQUIST.

Witnesses:
R. H. EDDY,
SAMUEL N. PIPER.